United States Patent
Jeoung et al.

(10) Patent No.: US 11,993,266 B1
(45) Date of Patent: May 28, 2024

(54) TRANSMISSION CONTROL SYSTEM AND METHOD FOR AN ELECTRIC VEHICLE

(71) Applicants: HYUNDAI MOTOR COMPANY, Seoul (KR); KIA CORPORATION, Seoul (KR)

(72) Inventors: Dongwon Jeoung, Suwon-si (KR); Sunghyun Cho, Yongin-si (KR); Sangmo Ha, Seongnam-si (KR); Jongyun Park, Hwaseong-si (KR); Jungwoo Seo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/239,614

(22) Filed: Aug. 29, 2023

(30) Foreign Application Priority Data

Dec. 7, 2022 (KR) .......................... 10-2022-0169907

(51) Int. Cl.
  *B60W 30/19* (2012.01)
  *B60W 10/02* (2006.01)
  *B60W 10/08* (2006.01)
  *B60W 10/11* (2012.01)

(52) U.S. Cl.
  CPC ............ *B60W 30/19* (2013.01); *B60W 10/02* (2013.01); *B60W 10/08* (2013.01); *B60W 10/11* (2013.01); *B60W 2540/10* (2013.01); *B60W 2710/022* (2013.01); *B60W 2710/083* (2013.01)

(58) Field of Classification Search
  CPC ...... B60W 30/19; B60W 10/02; B60W 10/08; B60W 10/11; B60W 2540/10; B60W 2710/022; B60W 2710/083; F16H 2061/0422; F16H 2061/0418; F16H 2061/044; F16H 2061/0474
  See application file for complete search history.

(56) References Cited

U.S. PATENT DOCUMENTS

| | | | |
|---|---|---|---|
| 2014/0214294 A1* | 7/2014 | Mori | F16D 11/10 701/60 |
| 2017/0267249 A1* | 9/2017 | Inoue | F16H 61/688 |
| 2019/0011044 A1* | 1/2019 | Ando | F16H 3/54 |

* cited by examiner

*Primary Examiner* — Huan Le
*Assistant Examiner* — Aimee Tran Nguyen
(74) *Attorney, Agent, or Firm* — Lempia Summerfield Katz LLC

(57) ABSTRACT

A transmission control system of an electric vehicle includes a motor configured to generate drive torque; a transmission configured to perform multi-stage shifting using a dog clutch in a restraint relationship with a one-way clutch configured to transmit forward power of the motor; a speed sensor configured to measure a rotation speed on an output side of the transmission; a motor control unit configured to control the drive torque from the motor according to a driver's accelerator position signal (APS) value; and a vehicle control unit configured to control the multi-stage shifting of the transmission according to a torque command based on the APS value, and to perform clutch alignment control by moving up a sleeve in a reverse direction to contact a hub through a reverse rotation operation of gear teeth by applying reverse rotation torque of predetermined drive force through the motor in a pre-engagement state of the dog clutch.

14 Claims, 8 Drawing Sheets

(A)

(B)

(C)

FIG. 8 – Prior Art
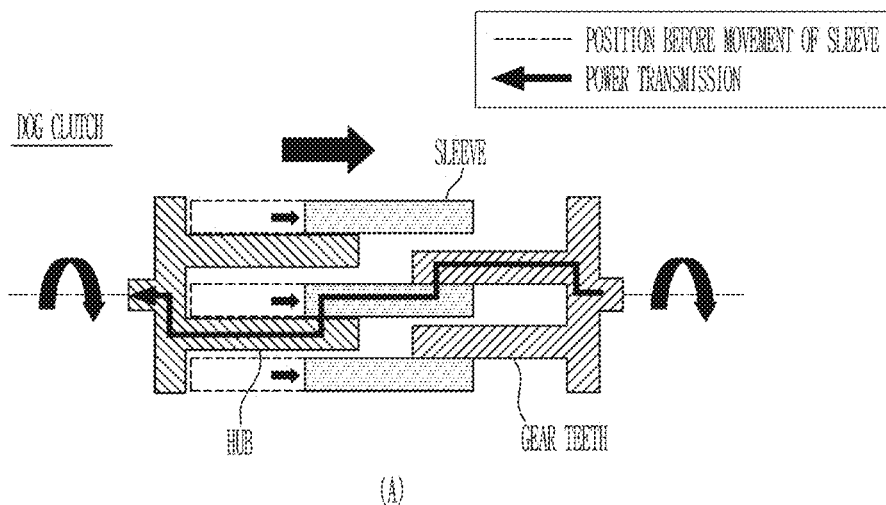
(A)
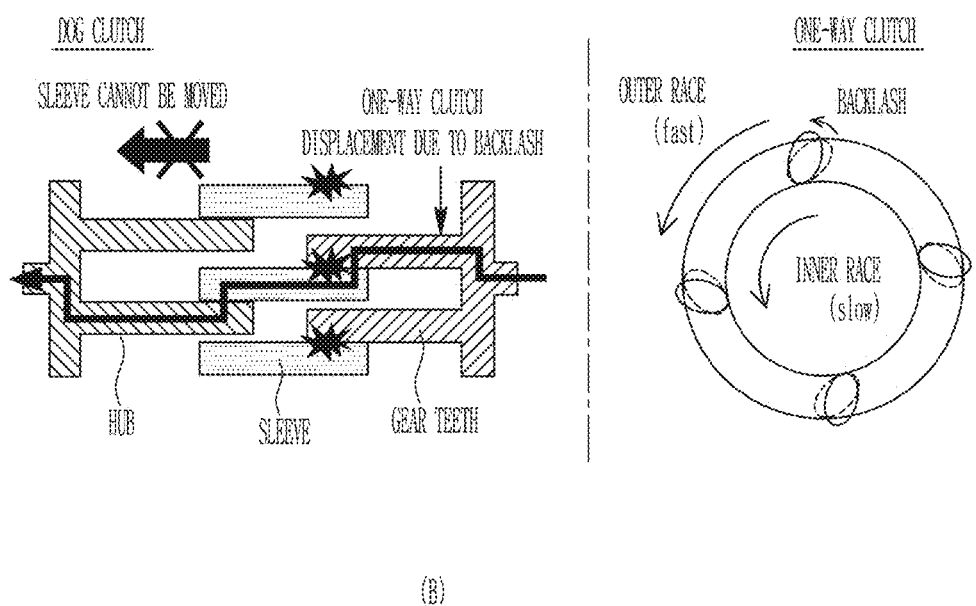
(B)

TRANSMISSION CONTROL SYSTEM AND METHOD FOR AN ELECTRIC VEHICLE

CROSS-REFERENCE TO RELATED APPLICATION

This application claims priority to and the benefit of Korean Patent Application No. 10-2022-0169907 filed in the Korean Intellectual Property Office on Dec. 7, 2022, the entire contents of which are incorporated herein by reference.

BACKGROUND

(a) Field of the Disclosure

The present disclosure relates to a dog clutch control system and method for a transmission. More particularly, the present disclosure relates to a transmission control system and method for an electric vehicle for disengagement of a dog clutch.

(b) Description of the Related Art

In the field of vehicle transmissions, a clutch is a device that is used for controlling the transmission of power. For example, in the case of an automatic transmission, a system is implemented by combining several clutches and power is transmitted according to each gear ratio as the combined clutches are actuated, i.e., engaged and disengaged. In this case, shafts connected to the respective clutches are in a state of rotating at either a transmission input speed or output speed, or a rotation speed multiplied by a gear ratio. In other words, the clutch performs speed synchronization, power transmission, and power transmission release by engaging and disengaging with shafts rotating at different speeds or the same speed.

Recently, in the field of transmissions, a dog clutch has been positively used to improve power transmission efficiency. For example, a transmission that is applied to an electric vehicle (EV) is a representative example.

FIG. 8 shows a dog clutch applied to a transmission for an electric vehicle of the related art and a situation in which the clutch cannot be disengaged.

Referring to FIG. 8, view (A), the dog clutch is a mechanism for transmitting power through engagement of teeth at both ends. The dog clutch has a simple configuration such as a hub, a sleeve, a gear tooth, and a sleeve drive motor.

The dog clutch has several advantages in that it does not use hydraulic pressure and has high transmission efficiency because it has no friction elements for speed synchronization at both ends of the clutch. On the other hand, since there is no fluid buffering action and no speed synchronization mechanism, precise speed synchronization and sleeve position control are required.

However, when precise control of the dog clutch is not performed, problems may occur. For example, an impact may be generated due to contact between the teeth without proper buffering, and a catching sensation and noise may be caused due to the engaging and disengaging methods for transmitting drive force.

FIG. 8, view (B), shows a transmission structure for an electric vehicle of the related art. In this configuration, a dog clutch is used as a separate component for improvement in transmission efficiency. The dog clutch is used as a separate constitutional element for regenerative braking in a shift stage using a one-way clutch.

However, an issue may occur in a forward power transmission situation of the transmission where the one-way clutch exhibits backlash. This situation can result in displacement within the dog clutch element that is in a restraint relationship with the one-way clutch. In this case, a problem may occur that the dog clutch is stochastically changed to a power transmission state rather than a pre-engagement state according to the relative positions of sleeve teeth and gear tooth elements. As a result, the dog clutch cannot be disengaged due to friction between the elements. In addition, a phenomenon occurs where it is impossible to shift because the dog clutch cannot be disengaged.

Regarding this problem, in the related art, a method of attempting to move the sleeve by operating a sleeve drive motor at maximum torque may be considered. However, in this case, there are disadvantages in that a judder phenomenon occurs or disengagement is impossible due to a torque limit in which the frictional force between the sleeve and the teeth is greater than that of the sleeve drive motor.

In addition, a method may be considered in which the shape of the teeth is modified, the number of teeth is adjusted, and a connection relationship between parts involved in the displacement of the dog clutch is excluded in the design. The application thereof is greatly limited due to interaction between design factors and NVH (Noise, Vibration, Harshness) performance and packaging limitations.

The subject matter described in the Background section is to enhance understanding of the background of the disclosure. Therefore, the Background section may include subject matter that has not been known to one having ordinary skill in the art to which the present technology belongs.

SUMMARY

Embodiments of the present disclosure are to provide a transmission control system and method for an electric vehicle that perform clutch alignment control for disengagement of a dog clutch when backlash of a one-way clutch applied to a transmission of the electric vehicle occurs.

According to one aspect of the present disclosure, a transmission control system of an electric vehicle includes a motor configured to generate drive torque and a transmission configured to perform multi-stage shifting using a dog clutch in a restraint relationship with a one-way clutch configured to transmit forward power of the motor. The transmission control system also includes a speed sensor configured to measure a rotation speed on an output side of the transmission and a motor control unit configured to control the drive torque from the motor according to a driver's accelerator position signal (APS) value. The transmission control system further includes a vehicle control unit configured to control the multi-stage shifting of the transmission according to a torque command based on the APS value. The vehicle control unit is also configured to perform clutch alignment control of moving up a sleeve in a reverse direction so as to contact a hub through a reverse rotation operation of gear teeth by applying reverse rotation torque of a predetermined drive force through the motor in a pre-engagement state of the dog clutch.

In addition, the transmission may include an input shaft IN configured to receive power from the motor and an output shaft OUT installed in parallel with the input shaft IN. The output shaft OUT is configured to transmit power through a multi-stage shift gear. The transmission may also include a drive shaft installed in parallel with the output shaft OUT and configured to transmit power transmitted through a final-stage gear to a drive wheel. The multi-stage shift gear may include a first-stage gear and a second-stage gear installed to be circumscribed with each other along a longitudinal direction of the input shaft IN and the output shaft OUT.

Further, the one-way clutch may be applied to the first-stage gear of the output shaft OUT to operate as a forward power transmission element. The dog clutch may be connected to a rear end of the one-way clutch to operate as a reverse power transmission element.

Further, the dog clutch may be configured to transmit forward power together with the one-way clutch by engaging the sleeve with the gear teeth. The dog clutch may also be configured to return to the hub side to transmit reverse power after disengaging the engagement for regenerative braking.

Further, the transmission may include a friction clutch applied to the second-stage gear of the output shaft OUT and configured to prevent speed synchronization and shift shock at both ends through mechanical slip.

Further, the vehicle control unit may be configured to increase clutch alignment control speed by limiting forward torque generation of the motor and increasing an amount of reverse rotation torque when an accelerator is operated or a forward torque by a driver's setting is input during the clutch alignment control.

Further, the vehicle control unit may be configured to determine that the clutch alignment control is completed. The vehicle control unit may be configured to terminate reverse rotation torque control through the motor when the rotation speed on the output side of the transmission is detected from the speed sensor during the clutch alignment control.

Further, the vehicle control unit may be configured to control the dog clutch to engagement, disengagement, and pre-engagement states by horizontally moving the sleeve using a sleeve actuator.

According to an aspect of the present disclosure, a transmission control method for an electric vehicle is configured to perform multi-stage shifting and includes a dog clutch in a restraint relationship with a one-way clutch configured to transmit forward power of a motor. The transmission control method includes collecting real-time driving information of a vehicle. The transmission control method also includes controlling the dog clutch to a pre-engagement state when the vehicle is stopped, and starting clutch alignment control for disengagement of the dog clutch in a driving situation after completion of the pre-engagement control. The transmission control method also includes moving up a sleeve in a reverse direction so as to contact a hub through a reverse rotation operation of gear teeth of the dog clutch by applying a reverse rotation torque of a predetermined drive force through the motor. The transmission control method further includes terminating reverse rotation torque control through the motor when the clutch alignment control is completed.

Further, the method may include increasing a clutch alignment control speed by limiting forward torque generation of the motor. The method may also include increasing an amount of reverse target torque when an accelerator is operated or a forward torque requirement by a driver's setting is input during the clutch alignment control.

Further, controlling the pre-engagement state may complete pre-engagement control in a state of being engaged with gear teeth by moving the sleeve of the dog clutch by a sleeve actuator.

Further, the clutch alignment control may perform element alignment of the dog clutch until a rotation speed signal value on an output side of the transmission is received from a speed sensor in the pre-engagement state.

Further, the clutch alignment control process may include applying a reverse target torque command to a motor control unit in the pre-engagement state of the dog clutch and reversely rotating the gear teeth of the dog clutch by reverse rotation of the motor. The clutch alignment control process may also include bringing upper surfaces of gear teeth of the sleeve moving in a reverse direction by the reverse rotation of the gear teeth into contact with lower surfaces of gear teeth of the hub. Additionally, the clutch alignment control process may include completing the clutch alignment control when a rotation speed signal on the output side of the transmission resulting from the contact between the gear teeth of the sleeve and the hub is received.

According to the embodiments of the present disclosure, the transmission performs the clutch alignment control of moving the sleeve of the dog clutch in advance to a position opposite to the forward drive of the motor. The dog clutch is in a restrained relationship with the one-way clutch. As a result, it is possible to solve the phenomenon that the dog clutch cannot be disengaged without interference due to the backlash of the one-way clutch caused at the time of forward drive.

In addition, by improving the phenomenon that the dog clutch cannot be disengaged through the software (S/W) that performs the clutch alignment control without adding or changing additional hardware (H/W), the transmission can be positively applied to an electric vehicle without additional cost. The transmission has the one-way clutch and the dog clutch mounted in a restraint relationship.

BRIEF DESCRIPTION OF THE DRAWINGS

FIG. 8, views (A) and (B), show a dog clutch applied to a transmission for an electric vehicle of the related art and a situation in which the clutch cannot be disengaged.

DETAILED DESCRIPTION

Figure 1:
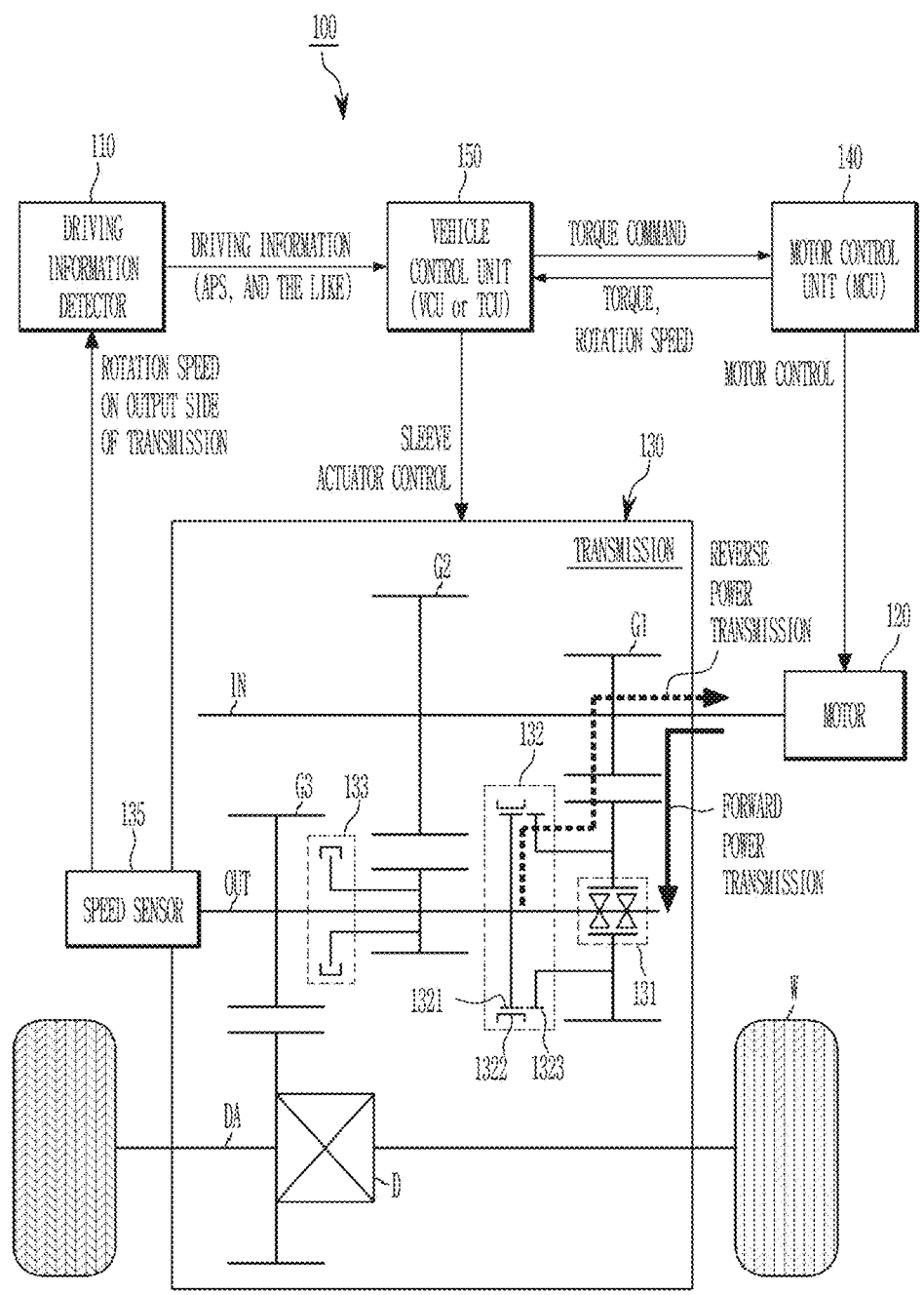
FIG. 1 schematically shows a configuration of a transmission control system of an electric vehicle according to an embodiment of the present disclosure.

In the following, embodiments of the present disclosure are described in detail so that one having ordinary skill in the art to which the present disclosure belongs can easily implement the present disclosure.

The terminology used herein is for the purpose of describing specific embodiments only and is not intended to be limiting the present disclosure. As used herein, the singular forms are intended to include the plural forms as well, unless the context clearly indicates otherwise. It should be further understood that the terms "comprises" and/or "comprising," when used in the present specification, specify the presence of stated features, integers, steps, operations, constitutional elements, and/or components. Such terms do not preclude the presence or addition of one or more other features, integers, steps, operations, constitutional elements, components, and/or groups thereof. As used herein, the term "and/or" includes any one or all combinations of the associated listed items.

Throughout the specification, terms such as first, second, A, B, (a), (b), and the like may be used to describe various constitutional elements, but the constitutional elements should not be limited by the terms. The terms are only used to distinguish the constitutional elements from other constitutional elements, and the nature, sequence, or order of the corresponding constitutional element is not limited by the term.

Throughout the specification, when it is mentioned that a certain constitutional element is "connected" or "coupled" to another constitutional element, it should be understood that the certain constitutional element may be directly connected or coupled to the other constitutional element or another intervening constitutional element may be present therebetween. Conversely, when it is mentioned that a certain constitutional element is "directly connected" or "directly coupled" to another constitutional element, it should be understood that there is no intervening constitutional element present therebetween.

The terms throughout the specification are merely used to describe specific embodiments of the present disclosure but are not intended to limit the present disclosure. The singular forms "a," "an," and "the" are intended to include plural forms as well, unless the context clearly indicates otherwise.

When a component, device, element, or the like of the present disclosure is described as having a purpose or performing an operation, function, or the like, the component, device, or element should be considered herein as being "configured to" meet that purpose or perform that operation or function.

Additionally, it should be understood that one or more of the methods or aspects thereof below may be executed by at least one or more control units. The term "control unit" may refer to a hardware device that includes a memory and a processor. The memory is configured to store program instructions and the processor is specially programmed to execute the program instructions so as to perform one or more processes described in more detail below. A control unit, as described herein, may control operations of units, modules, components, devices, or the like. It should also be understood that the methods below may be executed by a device that includes a control unit along with one or more other components, as should be appreciated by one having ordinary skill in the art.

Now, a transmission control system and method for an electric vehicle according to an embodiment of the present disclosure is described in detail with reference to the accompanying drawings.

FIG. 1 schematically shows a configuration of a transmission control system of an electric vehicle according to an embodiment of the present disclosure.

Figure 2:
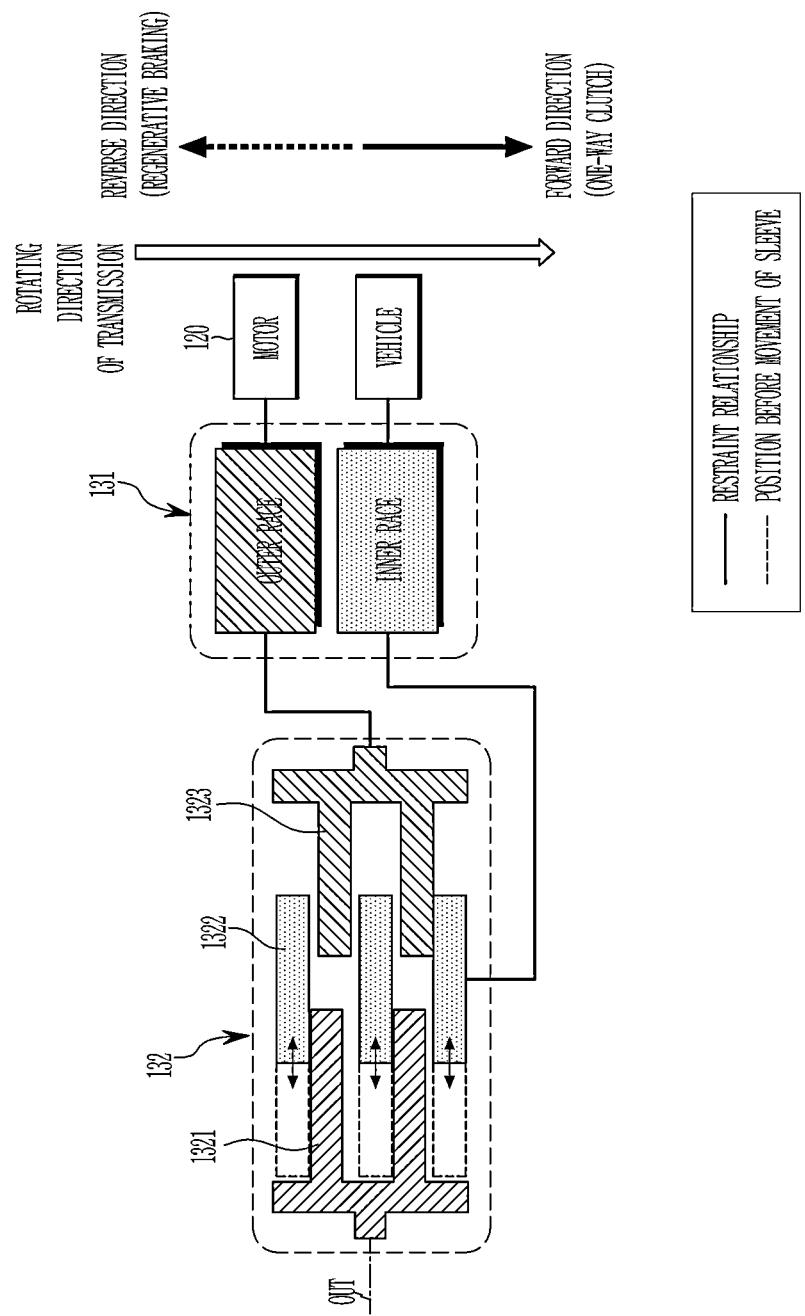
FIG. 2 shows a connection and restraint relationship between elements of a one-way clutch and a dog clutch applied to a transmission according to an embodiment of the present disclosure.

FIG. 2 shows a connection and restraint relationship between elements of a one-way clutch and a dog clutch applied to a transmission according to an embodiment of the present disclosure.

Figure 3:
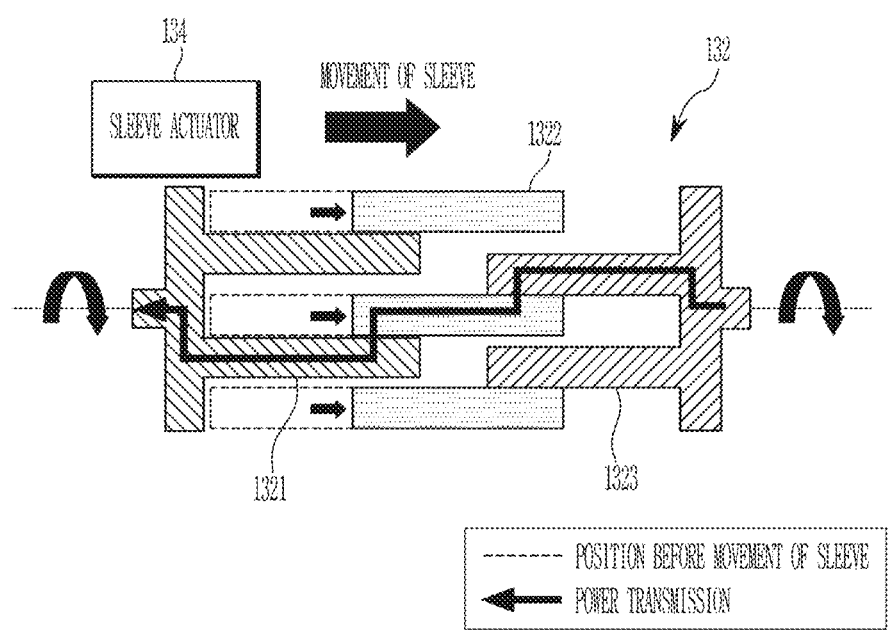
FIG. 3 shows an engaged state of the dog clutch applied to the transmission according to an embodiment of the present disclosure.

FIG. 3 shows an engaged state of the dog clutch applied to the transmission according to an embodiment of the present disclosure.

Referring to FIGS. 1-3, a transmission control system 100 of an electric vehicle (EV) according to an embodiment of the present disclosure includes a driving information detector 110. The driving information detector 110 detects driving information from various sensors according to a driver's driving intention. The transmission control system 100 also includes a motor 120 that generates a drive torque for a vehicle, and a transmission 130 that performs multi-stage shifting using a one-way clutch 131. The transmission control system also includes a dog clutch 132 and a friction clutch 133, a speed sensor 135 that measures a speed on an output side of the transmission, and a motor control unit (MCU) 140. The MCU 140 is configured to control the drive torque from the motor 120 according to an accelerator position sensor (APS) value collected with the driving information and the APS. Additionally, the transmission control system includes a vehicle control unit 150 that controls the multi-stage shifting of the transmission 130 according to a torque command based on the APS value.

The driving information detector 110 detects driving information necessary for transmission control from various sensors and control units according to vehicle traveling. The driving information detector 110 also transmits the driving information to the motor control unit 140 or the vehicle control unit 150. For example, the driving information detector 110 may detect driving information including at least one of a vehicle speed, an APS value, a motor torque, a wheel speed, and a shift stage according to the traveling of the electric vehicle. In addition, the driving information detector 110 may receive a speed on the output side of the transmission measured by the speed sensor 135 in real-time and transmit the speed to the vehicle control unit 150.

The motor 120 generates drive torque for driving the electric vehicle.

The transmission 130 includes a multi-stage shift gear G for an electric vehicle and heterogeneous clutches 131, 132, and 133 for dynamic transmission thereof.

The speed sensor 135 detects a rotation speed in revolutions per minute (RPM) on the output side of the transmission 130 and generates a signal thereof.

The vehicle control unit 150 (VCU) is a computing system that controls the overall operations of a vehicle, including a transmission control function. However, the embodiment of the present disclosure is not limited thereto. The vehicle control unit can be implemented as a transmission control unit (TCU) for transmission control.

The vehicle control unit 150 transmits to the motor control unit 140 a torque command considering a driver's APS value, a vehicle state, and a driving condition based on the driving information collected in real-time.

The motor control unit 140 drives the motor 120 according to the torque command received from the vehicle control unit 150.

The motor control unit 140 may perform motor torque increase control and motor torque regeneration control. Additionally, the motor control unit 140 may transmit actual motor torque and actual speed information according to the control of the vehicle to the vehicle control unit 150.

The vehicle control unit 150 controls operations of the transmission 130 and the heterogeneous clutches 131, 132, and 133 applied to the transmission 130, in consideration of the actual motor torque and actual speed information. In this case, the vehicle control unit 150 may control a moving position of a sleeve 1322 by applying a current command to a sleeve actuator 134 for the actuation of the dog clutch 132.

The transmission 130 includes an input shaft IN that receives power from the motor 120 and an output shaft OUT that transmits power through a multi-stage shift gear G. The output shaft OUT is installed in parallel with the input shaft IN. The transmission 130 also includes a drive shaft DA that is installed in parallel with the output shaft OUT and transmits power transmitted through a final-stage gear G3 to the drive wheels W.

The multi-stage shift gear G includes a first-stage gear G1 and a second-stage gear G2 installed to be circumscribed with each other along a longitudinal direction or lengthwise direction of the input shaft IN and the output shaft OUT.

In addition, the drive shaft DA may transmit, to the drive wheels W on both sides through a differential D, power transmitted through a final-stage gear G3. The final-stage gear G3 is installed to be circumscribed with the output shaft OUT. The drive wheels include at least one of front wheels and rear wheels of the electric vehicle.

The transmission 130 includes a one-way clutch 131 that is applied to the first-stage gear G1 of the output shaft OUT and operates as a forward power transmission element. The transmission 130 also includes a dog clutch 132 that is connected to a rear end of the one-way clutch 131 and operates as a reverse power transmission element.

In addition, the transmission 130 includes a friction clutch 133 that is applied to the second-stage gear G2 of the output shaft OUT. The friction clutch 133 is configured to prevent speed synchronization and shift shock at both ends through mechanical slip.

The friction clutch 133 may be constructed using dry or wet friction material.

The dog clutch 132 includes a hub 1321 that is connected to the output shaft OUT and gear teeth 1323 that are connected to the one-way clutch 131 of the first-stage gear G1. The dog clutch 132 also includes a sleeve 1322 that moves linearly and selectively engages between the hub 1321 and the gear teeth 1323. Hereinafter, the hub 1321 and the sleeve 1322 may mean the teeth of each element.

The sleeve 1322 is moved by an electrically actuated sleeve actuator 134.

The vehicle control unit 150 may control a moving position of the sleeve 1322 by applying a current command to the sleeve actuator 134 to actuate the dog clutch 132.

For example, the vehicle control unit 150 may control the dog clutch 132 to engagement, disengagement, and pre-engagement states by horizontally moving the sleeve 1322 using (e.g., through or via) the sleeve actuator 134.

For example, as shown in FIG. 3, the sleeve 1322 moves to and engages with the gear tooth 1323, and transmits forward power input through the motor 120 and the one-way clutch 131 to the drive shaft DA.

In other words, the dog clutch 132 engages the sleeve 1322 with the gear teeth 1323 to transmit forward power together with the one-way clutch 131. This may be referred to as a dog clutch engaged state.

In addition, the sleeve 1322 disengages the engagement for regenerative braking in a state in which the dog clutch 132 is engaged and returns to the hub 1321 to transmit reverse power. This may be referred to as clutch disengagement.

The dog clutch 132 operates in a pre-engagement state at the time of regenerative braking, engages the clutch in advance for a subsequent driving situation, and disengages the pre-engagement at the time of starting or shifting based on the collected driving information.

Figure 4:
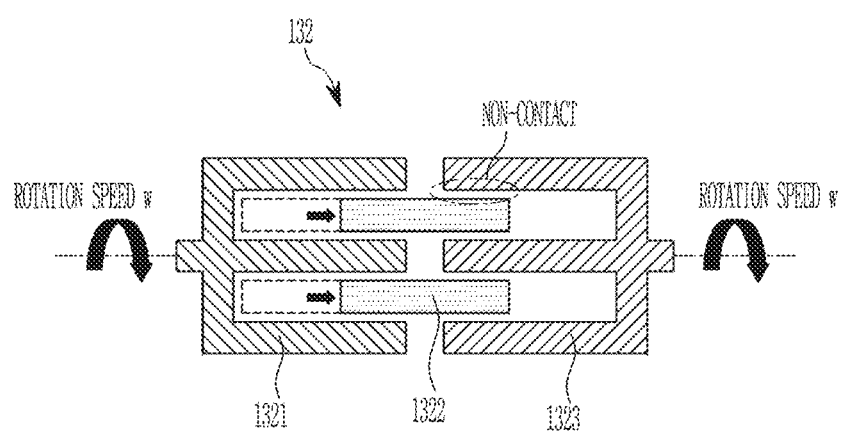
FIG. 4 shows a pre-engagement control state of the dog clutch according to an embodiment of the present disclosure.

FIG. 4 shows a pre-engagement control state of the dog clutch according to an embodiment of the present disclosure.

Referring to FIG. 4, the pre-engagement control state of the dog clutch is a clutch engaged state. However, in the pre-engagement state, the power is not transmitted, and the clutch elements are rotated by rotation of each shaft connected to the clutch. In the pre-engagement state, since the clutch elements are rotated by the rotation of each shaft, the rotation speeds of the elements are the same and power is not transmitted because the sleeve and the gear teeth are not in contact with each other.

The dog clutch 132 is actuated in the pre-engagement state for regenerative braking and is actuated to release the pre-engagement state at the time of acceleration or shifting according to the driver's intention.

However, in the structure of the transmission 130 using the one-way clutch 131 and the dog clutch 132, the phenomenon that the dog clutch 132 cannot be disengaged due to the backlash of the one-way clutch 131 may occur.

Figure 5:
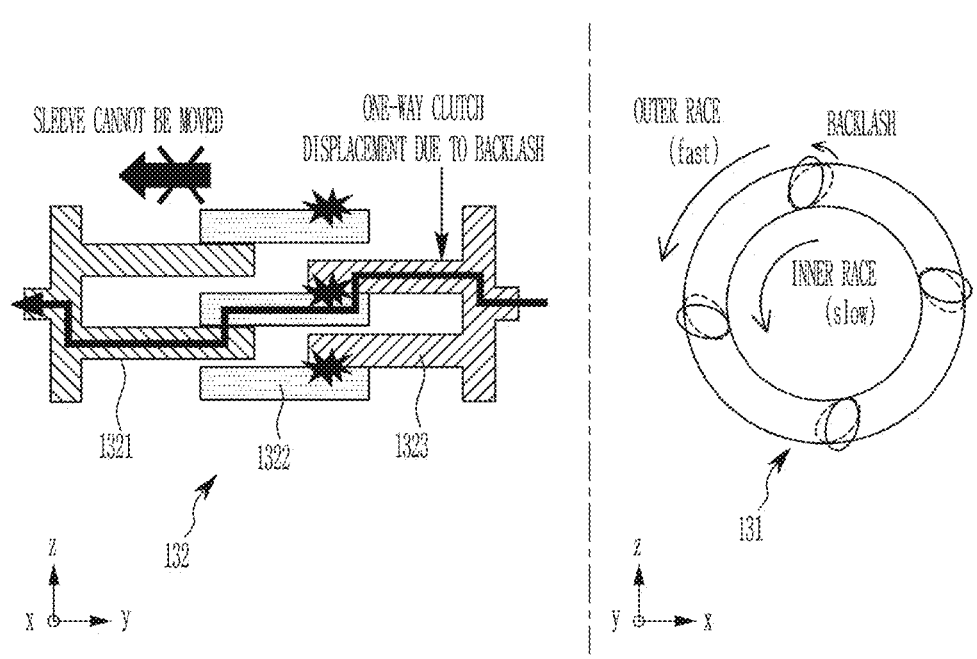
FIG. 5 shows a phenomenon that the dog clutch cannot be disengaged due to backlash of the one-way clutch applied to the transmission.

For example, FIG. 5 shows a phenomenon that the dog clutch cannot be disengaged due to the backlash of the one-way clutch applied to the transmission.

Referring to FIG. 5, displacement may occur in the dog clutch element 132 that is in a restraint relationship with the one-way clutch 131 due to the backlash of the one-way clutch 131 in a forward power transmission situation of the transmission 130. In this case, the dog clutch 132 is stochastically changed to a power transmission state rather than the pre-engagement state according to the relative positions of the elements. The dog clutch 132 is put into a situation in which it cannot be disengaged due to friction between the elements (i.e., stress between gear teeth and sleeve teeth).

Since such a situation in which the dog clutch cannot be disengaged causes a situation that acceleration and/or shifting is difficult, contrary to the driver's intention, precise control for disengagement of the dog clutch is required in the structure of the transmission 130.

Therefore, in an embodiment of the present disclosure, the vehicle control unit 150 solves the phenomenon where the dog clutch cannot be disengaged. This is achieved by performing clutch alignment control, which involves aligning the elements of the dog clutch 132 in consideration of the backlash of the one-way clutch 131 applied to the transmission 130.

Therefore, in the pre-engagement state of the dog-clutch 132, the vehicle control unit 150 performs clutch alignment control by moving up the sleeve 1322 in a reverse direction so as to contact the hub 1321. This is achieved through a reverse rotation operation of the gear teeth 1323 by applying a reverse rotation torque of a predetermined drive force through the motor 120. The predetermined drive force refers to a minute (small) rotation force capable of moving the sleeve 1322 to a position of the hub 1321 in the reverse direction through the gear teeth 1323.

The vehicle control unit 150 may be implemented with one or more processors that operate according to a set program. The set program may be one programmed to perform each step of the transmission control method for an electric vehicle for disengagement of the dog clutch according to an embodiment of the present disclosure.

The transmission control method for an electric vehicle is described in more detail with reference to the drawings below.

Figure 6:
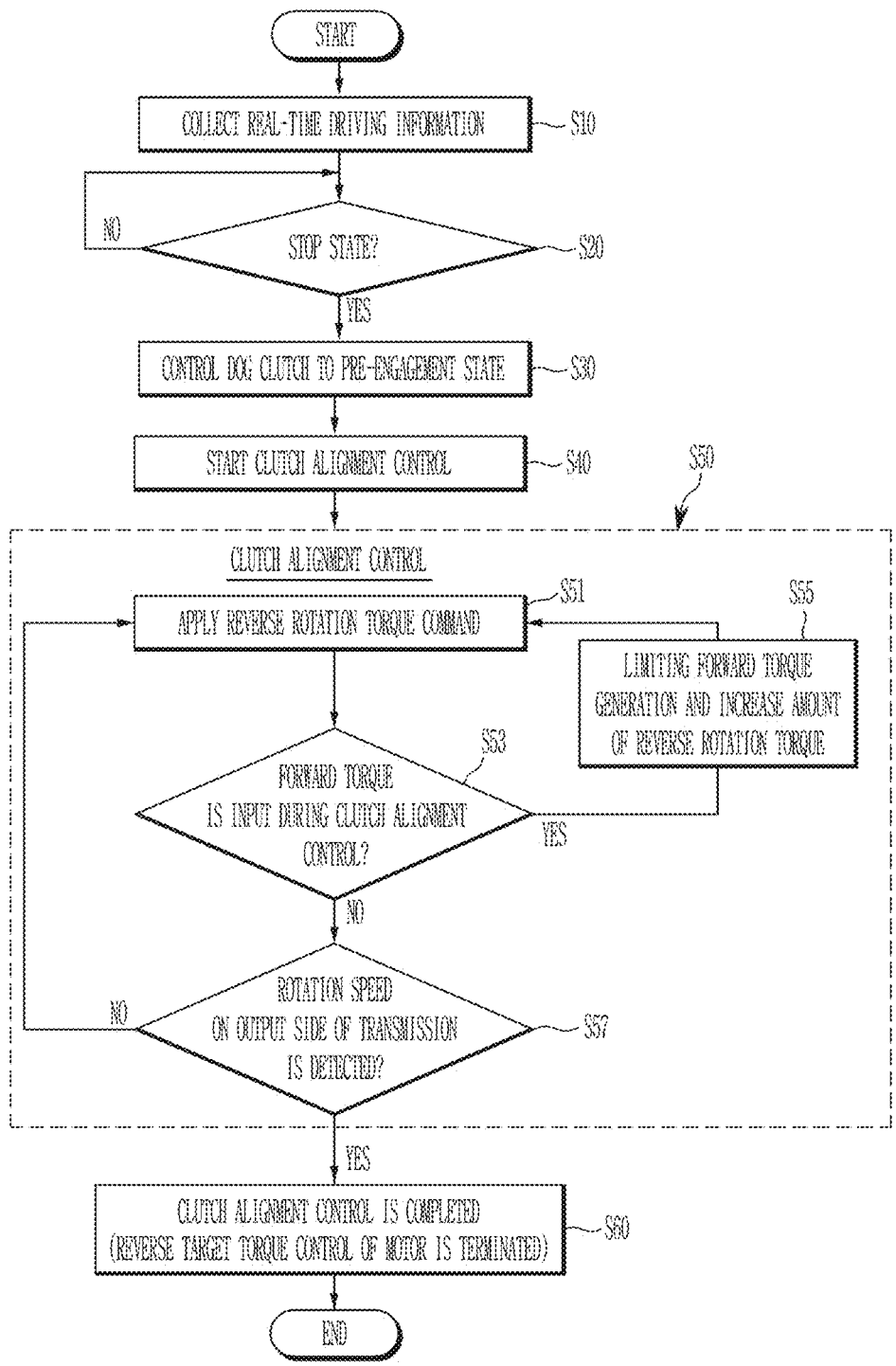
FIG. 6 is a flowchart schematically showing a transmission control method for an electric vehicle an according to an embodiment of the present disclosure.

FIG. 6 is a flowchart schematically showing a transmission control method for an electric vehicle according to an embodiment of the present disclosure.

Figure 7:
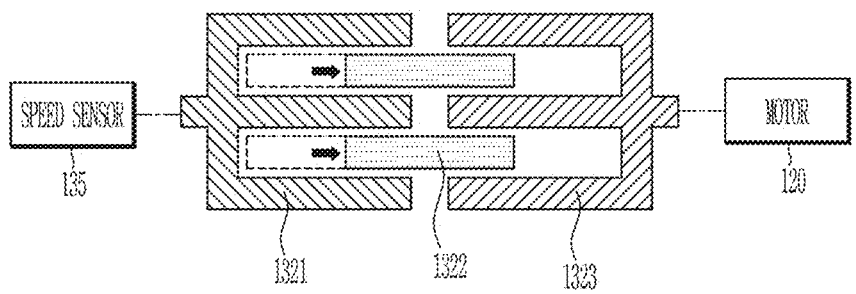
FIG. 7, views (A)-(C), show a clutch alignment control state for disengagement of a dog clutch according to an embodiment of the present disclosure.
Figure 7:
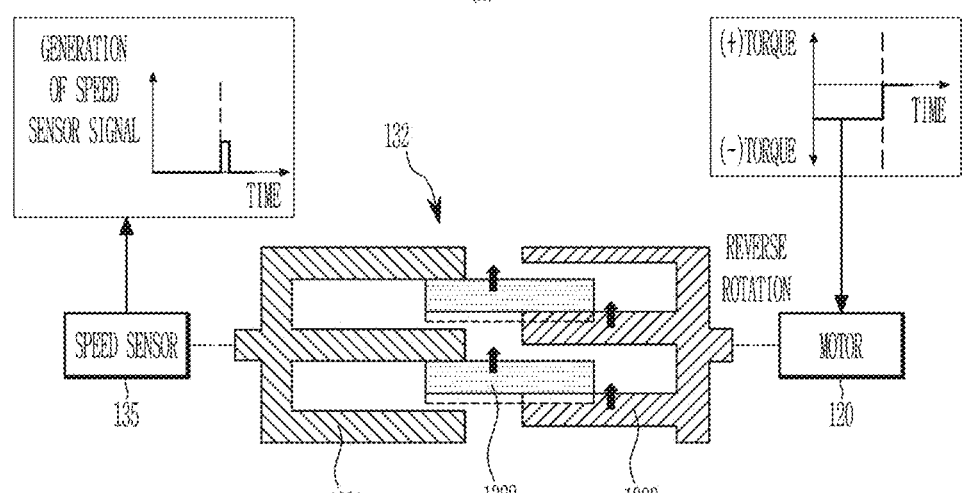
Figure 7:
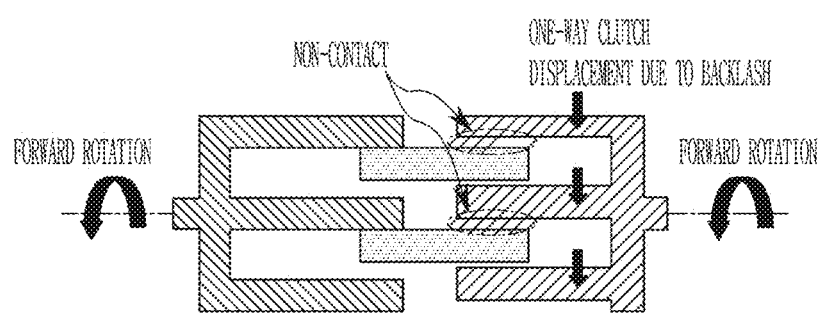

FIG. 7 shows a clutch alignment control state for disengagement of a dog clutch according to an embodiment of the present disclosure.

Referring to FIGS. 6 and 7, the vehicle control unit 150 according to an embodiment of the present disclosure collects real-time driving information necessary for transmission control from the driving information detector 110 (S10).

The vehicle control unit 150 checks the driving information. When the vehicle is in a stopped state in which there is no drivers APS input or the drive torque is not applied (S20; Yes), the vehicle control unit 150 controls the dog clutch 132 to the pre-engagement state in which the dog clutch is engaged in advance for a future driving situation (S30). In this case, the vehicle control unit 150 may move the sleeve 1322 of the dog clutch 132 using the sleeve actuator 134 to complete the pre-engagement control in a state of being engaged with the gear teeth 1323 (refer to FIG. 7, view (A)).

After completing the pre-engagement control (S40), the vehicle control unit 150 starts the clutch alignment control for smooth disengagement of the dog clutch 132 in a driving situation.

The vehicle control unit 150 performs clutch alignment control by aligning the elements of the dog clutch 132 until a rotation speed signal value on the output side of the transmission is generated from the speed sensor 135 in the pre-engagement state of the dog clutch 132 (S50).

The clutch alignment control refers to moving up the teeth of the sleeve 1322 to contact the teeth of the hub 1321. This is achieved by applying a reverse rotation torque command of a small drive force to the motor control unit 140 to reversely rotate the gear teeth 1323 through the motor 120 (S51) (refer to FIG. 7, view (B)). The rotation torque command includes a reverse target torque value for the predetermined drive force.

Specifically, the clutch alignment control process may include, by the vehicle control unit 150, applying a reverse target torque command to the motor control unit 140 in the pre-engagement state of the dog clutch 132. The clutch alignment control process may also include reversely rotating the gear teeth 1323 of the dog clutch 132 by reverse rotation of the motor 120. The clutch alignment control process may further include bringing the upper surfaces of the gear teeth of the sleeve 1322 into contact with the lower surfaces of the gear teeth of the hub 1321. The upper surfaces of the gear teeth of the sleeve 1322 are moving in a reverse direction by the reverse rotation of the gear teeth 1323. The clutch alignment control process may further include completing the clutch alignment control when a rotation speed signal on the output side of the transmission is received. The rotation speed signal on the output side of the transmission results from the contact between the sleeve 1322 and the hub 1321.

The vehicle control unit 150 may further collect driving information in real-time during the clutch alignment control. The vehicle control unit 150 may monitor whether the driver inputs forward torque and whether the rotation speed signal on the output side of the transmission is detected (S53 and S57).

In step S53, if a forward torque request is input by an accelerator operation or driver setting during the clutch alignment control (S53; Yes), the vehicle control unit 150 rapidly increases the clutch alignment control speed by limiting the forward torque generation of the motor 120 and increasing an amount of the reverse target torque (S55). The forward torque limit can enable rapid alignment while accepting the impact by requesting the motor control unit 140 to temporarily delay the forward torque or increase the amount of reverse rotation torque to a value greater than the forward torque.

In addition, in step S57, if the rotation speed on the output side of the transmission is detected during the clutch alignment control (S57; Yes), it is determined that the clutch alignment control is completed and the reverse rotation torque control through the motor 120 is terminated (S60).

FIG. 7, view (C), shows a state in which displacement has occurred in the gear teeth 1323 of the dog clutch 132 due to the forward drive of the motor 120 and the backlash of the one-way clutch 131 after completing the clutch alignment control according to an embodiment of the present disclosure.

In this case, the sleeve 1322 of the dog clutch 132, for which the clutch alignment control has been completed, has been moved to a position of the hub 1321 in an opposite direction (reverse direction) to the drive direction (forward direction) of the gear teeth 1323. Therefore, it is possible to solve the problem that the dog clutch cannot be disengaged by maintaining a non-contact state at all times, even if displacement occurs in the gear teeth 1323 due to the backlash.

In this way, according to the embodiment of the present disclosure, the transmission performs the clutch alignment control of moving the sleeve of the dog clutch in advance to a position opposite to the forward drive of the motor. The dog clutch is in a restraint relationship with the one-way clutch when this occurs. As a result, it is possible to solve the phenomenon that the dog clutch cannot be disengaged, without interference due to the backlash of the one-way clutch caused at the time of forward drive.

In addition, by improving the phenomenon that the dog clutch cannot be disengaged through the software (S/W) that performs the clutch alignment control without adding or changing additional hardware (H/W), the transmission in which the one-way clutch and the dog clutch are mounted in a restraint relationship can be positively applied to an electric vehicle without additional cost.

The embodiments of the present disclosure are not implemented only through the devices and/or methods described above. The embodiments may also be implemented through a program for realizing functions corresponding to the configuration of the embodiments of the present disclosure, a recording medium on which the program is recorded, and the like. Such implementation can be realized by one having ordinary skill in the art to which the present disclosure belongs, based on the embodiments described above.

Although embodiments of the present disclosure have been described in detail, the scope of the present disclosure is not limited thereto. It should be apparent that various modifications and improvements made by one skilled in the art by using the basic concept of the present disclosure defined in the following claims also fall within in the scope of the present disclosure.

DESCRIPTION OF SYMBOLS

100: transmission control system
110: driving information detector
120: motor
130: transmission
131: one-way clutch
132: dog clutch 1321: hub
1322: sleeve
1323: gear teeth
133: friction clutch
134: sleeve actuator
135: speed sensor
140: motor control unit (MCU)
150: vehicle control unit (VCU/TCU)

What is claimed is:

1. A transmission control system of an electric vehicle, the transmission control system comprising:
    a motor configured to generate a drive torque;
    a transmission configured to perform multi-stage shifting using a dog clutch in a restraint relationship with a one-way clutch configured to transmit forward power of the motor;
    a speed sensor configured to measure a rotation speed on an output side of the transmission;
    a motor control unit configured to control the drive torque from the motor according to a driver's accelerator position signal (APS) value; and
    a vehicle control unit configured to control the multi-stage shifting of the transmission according to a torque command based on the APS value, and to perform clutch alignment control of moving up a sleeve in a reverse direction so as to contact a hub through a reverse rotation operation of gear teeth by applying reverse rotation torque of a predetermined drive force through the motor in a pre-engagement state of the dog clutch.

2. The transmission control system of claim 1, wherein the transmission comprises:
    an input shaft IN configured to receive power from the motor;
    an output shaft OUT installed in parallel with the input shaft IN and configured to transmit power through a multi-stage shift gear; and
    a drive shaft installed in parallel with the output shaft OUT and configured to transmit power transmitted through a final-stage gear to a drive wheel, and
    wherein the multi-stage shift gear comprises a first-stage gear and a second-stage gear installed to be circumscribed with each other along a longitudinal direction of the input shaft IN and the output shaft OUT.

3. The transmission control system of claim 2, wherein:
    the one-way clutch is applied to the first-stage gear of the output shaft OUT to operate as a forward power transmission element; and
    wherein the dog clutch is connected to a rear end of the one-way clutch to operate as a reverse power transmission element.

4. The transmission control system of claim 3, wherein the dog clutch is configured to transmit forward power together with the one-way clutch by engaging the sleeve with the gear teeth, and to return to a hub side to transmit reverse power after disengaging the engagement for regenerative braking.

5. The transmission control system of claim 2, wherein the transmission further comprises:
    a friction clutch applied to the second-stage gear of the output shaft OUT and configured to prevent speed synchronization and shift shock at both ends through mechanical slip.

6. The transmission control system of claim 1, wherein the vehicle control unit is further configured to increase clutch alignment control speed by limiting forward torque generation of the motor and increasing an amount of reverse rotation torque when an accelerator is operated or forward torque by a driver's setting is input during the clutch alignment control.

7. The transmission control system of claim 6, wherein the vehicle control unit is further configured to determine that the clutch alignment control is completed, and to terminate reverse rotation torque control through the motor when the rotation speed on the output side of the transmission is detected from the speed sensor during the clutch alignment control.

8. The transmission control system of claim 1, wherein the vehicle control unit is further configured to control the dog clutch to engagement, disengagement, and pre-engagement states by horizontally moving the sleeve using a sleeve actuator.

9. A transmission control method for an electric vehicle configured to perform multi-stage shifting and including a dog clutch in a restraint relationship with a one-way clutch configured to transmit forward power of a motor, the transmission control method comprising:
    collecting real-time driving information of a vehicle and controlling the dog clutch to a pre-engagement state when the vehicle is stopped;
    starting clutch alignment control for disengagement of the dog clutch in a driving situation after completion of the pre-engagement control;
    moving up a sleeve in a reverse direction so as to contact a hub through a reverse rotation operation of gear teeth of the dog clutch by applying reverse rotation torque of a predetermined drive force through the motor; and
    terminating reverse rotation torque control through the motor when the clutch alignment control is completed.

10. The transmission control method of claim 9, further comprising:
    increasing clutch alignment control speed by limiting forward torque generation of the motor and increasing an amount of reverse rotation torque when an accelerator is operated or forward torque requirement by a driver's setting is input during the clutch alignment control.

11. The transmission control method of claim 9, wherein the controlling to the pre-engagement state completes pre-engagement control in a state of being engaged with gear teeth by moving the sleeve of the dog clutch using a sleeve actuator.

12. The transmission control method of claim 9, wherein the clutch alignment control performs element alignment of the dog clutch until a rotation speed signal value on an output side of the transmission is received from a speed sensor in the pre-engagement state.

13. The transmission control method of claim 12, wherein the clutch alignment control process comprises:
    applying a reverse target torque command to a motor control unit in the pre-engagement state of the dog clutch;
    reversely rotating the gear teeth of the dog clutch by reverse rotation of the motor,
    bringing upper surfaces of gear teeth of the sleeve moving in a reverse direction by the reverse rotation of the gear teeth into contact with lower surfaces of gear teeth of the hub; and
    completing the clutch alignment control when a rotation speed signal on the output side of the transmission resulting from the contact between the gear teeth of the sleeve and the hub is received.

14. The transmission control method of claim 9, wherein the clutch alignment control process comprises:

applying a reverse target torque command to a motor control unit in the pre-engagement state of the dog clutch;

reversely rotating the gear teeth of the dog clutch by reverse rotation of the motor;

bringing upper surfaces of gear teeth of the sleeve moving in a reverse direction by the reverse rotation of the gear teeth into contact with lower surfaces of gear teeth of the hub; and completing the clutch alignment control when a rotation speed signal on an output side of the transmission resulting from the contact between the gear teeth of the sleeve and the hub is received.

\* \* \* \* \*